(12) United States Patent
Dai et al.

(10) Patent No.: US 9,904,107 B2
(45) Date of Patent: Feb. 27, 2018

(54) OPTICAL FILM AND DISPLAY DEVICE WITH NARROW FRAME

(71) Applicant: HON HAI PRECISION INDUSTRY CO., LTD., New Taipei (TW)

(72) Inventors: Feng-Yuen Dai, New Taipei (TW); Chau-Jin Hu, New Taipei (TW); Yung-Lun Huang, New Taipei (TW); Li-Ying Wang He, New Taipei (TW); Po-Chou Chen, New Taipei (TW); Shih-Pin Lin, New Taipei (TW); Ting-Yi Liao, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 0 days.

(21) Appl. No.: 15/218,293

(22) Filed: Jul. 25, 2016

(65) Prior Publication Data

US 2017/0343857 A1 Nov. 30, 2017

(30) Foreign Application Priority Data

May 31, 2016 (TW) .................................. 105116971

(51) Int. Cl.
*G09F 13/08* (2006.01)
*G02F 1/1335* (2006.01)
*H01J 17/49* (2012.01)

(52) U.S. Cl.
CPC .. *G02F 1/133606* (2013.01); *G02F 1/133603* (2013.01); *H01J 17/49* (2013.01)

(58) Field of Classification Search
CPC .......... G02F 1/133606; G02F 1/133603; H01J 17/49
USPC ......................................... 362/97.2
See application file for complete search history.

(56) References Cited

U.S. PATENT DOCUMENTS 6,166,787 A * 12/2000 Akins ....................... G02B 1/11
348/337
2010/0109988 A1 * 5/2010 Kao .................. G02F 1/133526
345/87

* cited by examiner

*Primary Examiner* — Laura Gudorf
(74) *Attorney, Agent, or Firm* — ScienBiziP, P.C.

(57) ABSTRACT

An optical film to visually reduce frame size of individual display units within a single large display includes four film portions connected to each other to form a rectangular frame of each individual display unit. Each film portion has strip-shaped micro-structures of triangular cross-section, and includes a bottom surface, a first side surface, and a second side surface. The bottom surfaces of the micro-structures are connected to each other. The first side surfaces and the second side surfaces are obliquely connected, the second side surface of one micro-structure being at the outermost side of each film portion. Angle $\theta_1$ between the first side and bottom surface of each micro-structure is less than angle $\theta_2$ between the first side surface and the second side surface and the sum of first and second angles $\theta_1$ and $\theta_2$ is less than 90°.

12 Claims, 4 Drawing Sheets

OPTICAL FILM AND DISPLAY DEVICE WITH NARROW FRAME

FIELD

The subject matter herein generally relates to display devices, and more particularly, to an optical film and a display device with narrow frame.

BACKGROUND

Display devices used for outdoor advertisement are big. The overall display device may comprise a number of smaller display screens that cooperatively display an entire image on the overall display device. However, each smaller display screen of the overall display device includes a frame, and the image displayed on the overall display device is cut by the frames of the display screens, thereby presenting an image with discontinuities and not visually smooth.

BRIEF DESCRIPTION OF THE DRAWINGS

Implementations of the present technology will now be described, by way of example only, with reference to the attached figures.

DETAILED DESCRIPTION

Figure 1:
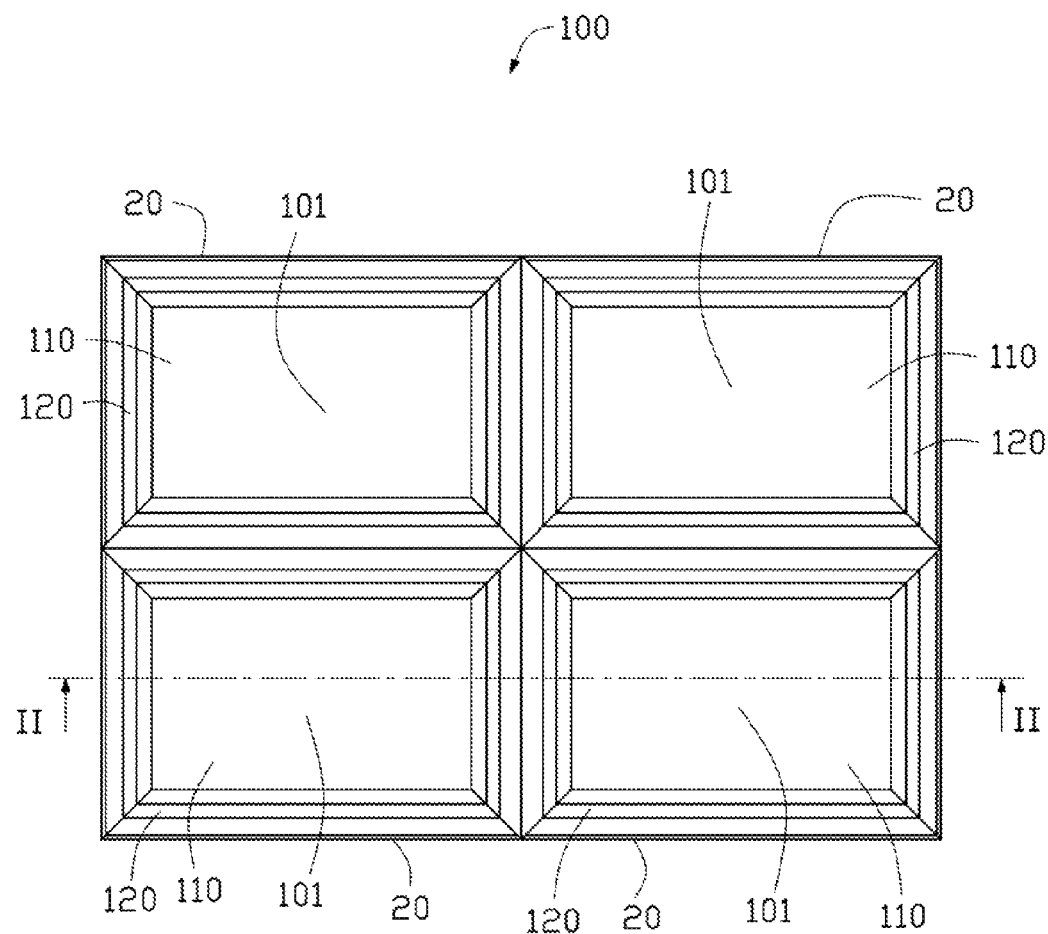
FIG. 1 is a diagrammatic view of an exemplary embodiment of a display device with narrow frame.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Figure 2:
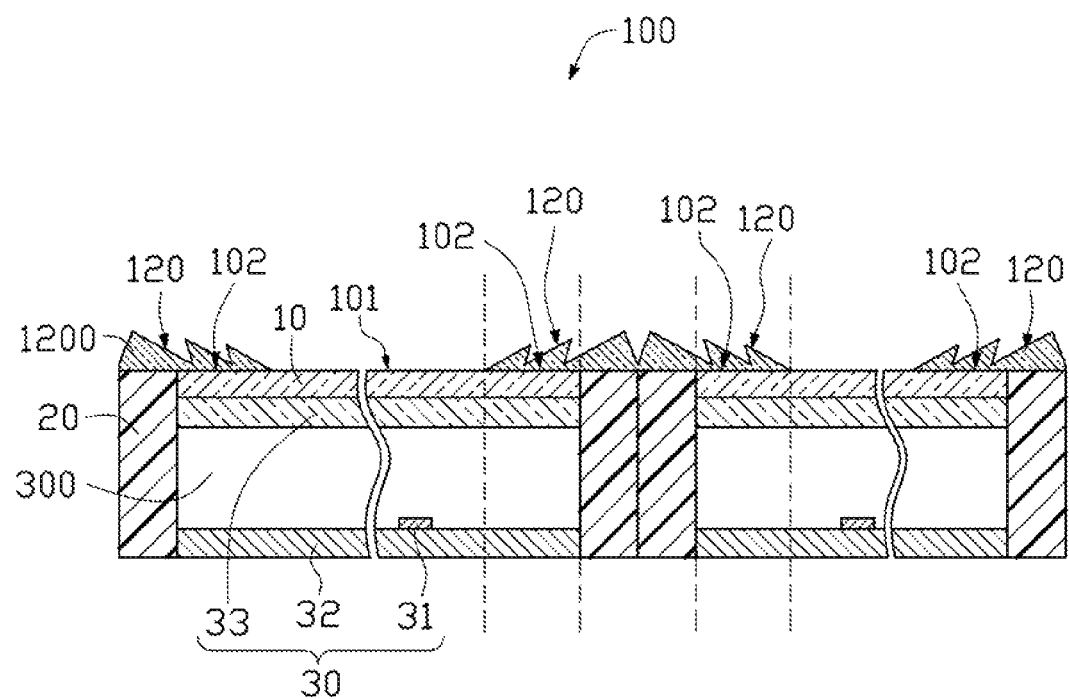
FIG. 2 is a cross-sectional view of the display device of FIG. 1 taken along line II-II.

FIGS. 1 and 2 illustrate a display device 100. The display device 100 having a narrow frame comprises a plurality of smaller display screens 110 and a plurality of optical films 120. The display screens 110 are arranged in a matrix.

In at least one exemplary embodiment, the display device 100 comprises four display screens 110 arranged in a 2×2 matrix. In other exemplary embodiments, the number of the display screens 110 can be different.

In at least one exemplary embodiment, the display screens 110 may be liquid crystal display devices. In other exemplary embodiments, the display screens 110 may be plasma display devices.

Each display screen 110 comprises a display panel 10, a frame 20, and a backlight module 30. The display panel 10 comprises a central area 101 and four boundaries 102 (only two boundaries 102 shown in the II-II section of FIG. 2) around the central area 101.

The frame 20 is mounted to the boundaries 102, and can be made of opaque resin material.

The backlight module 30 comprises at least one backlight source 31, a circuit board 32, and a diffusion plate 33. The display panel 10, the frame 20, and the circuit board 32 cooperatively define a receiving space 300. An underside of the backlight source 31 and the diffusion plate 33 are received in the receiving space 300. The backlight source 31 is fixed on and electrically connected to the circuit board 32. In at least one exemplary embodiment, the backlight source 31 is an LED or a diode laser. The diffusion plate 33 is positioned closely to and attached to the display panel 10, and is positioned above the backlight source 31 to direct light emitted from the backlight source 31 towards the display panel 10.

Each optical film 120 is formed on one display screen 110, and comprises four film portions 1200 connected to each other, to form a hollow rectangle. Each film portion 1200 covers one boundary 102 and the frame 20 mounted to the boundary 102. Two film portions 1200 which are opposite to each other are mirror-image symmetrical. Two adjacent optical films 120 are connected to each other, and are mirror-image symmetrical to each other along a connecting surface of the optical films 120.

In at least one exemplary embodiment, the optical film 120 has a thickness of about 0.025 mm to about 0.3 mm.

Figure 3:
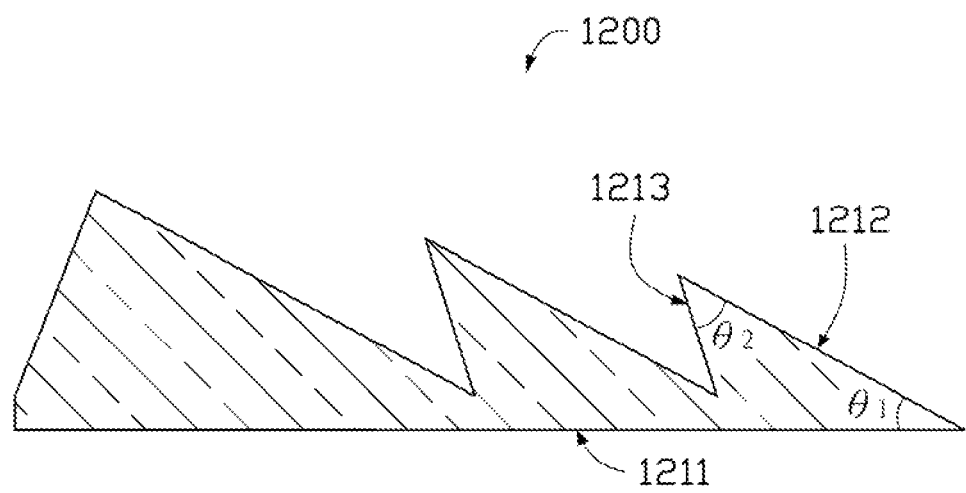
FIG. 3 is a diagrammatic view of an optical film comprised in the display device of FIG. 1.
Figure 4:
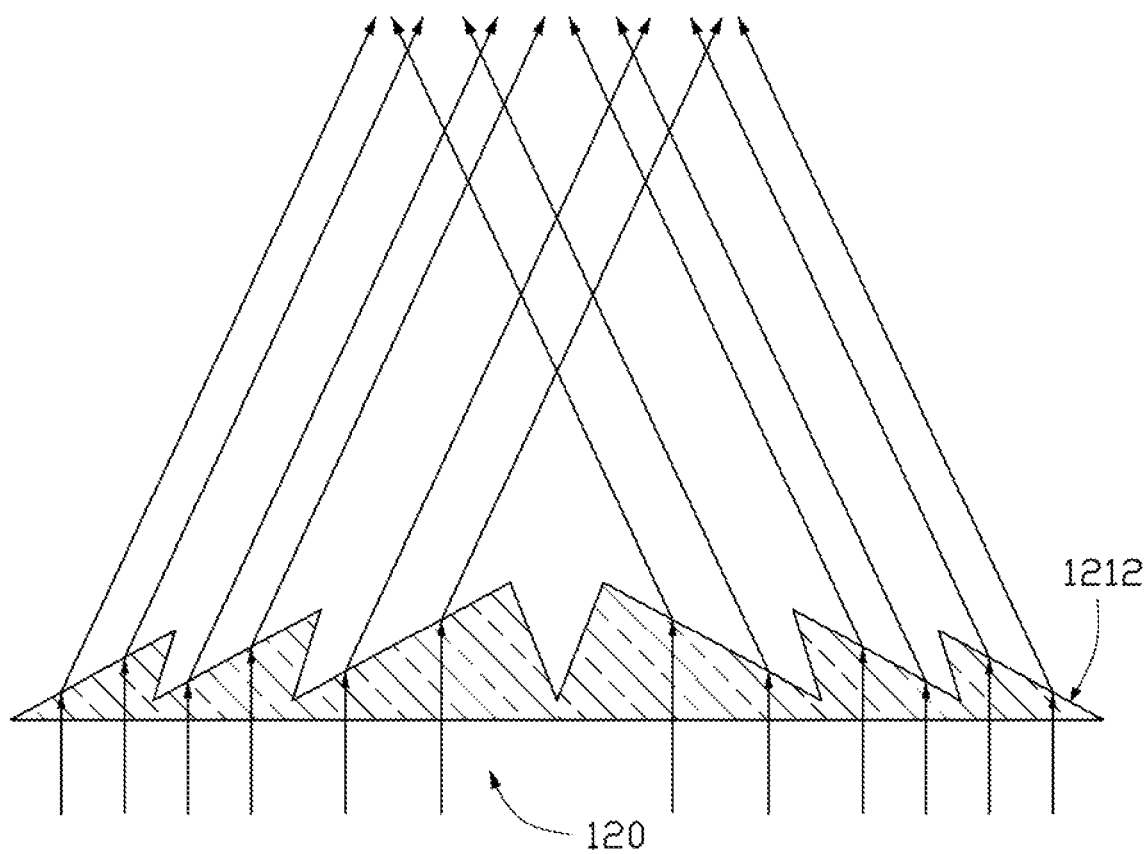
FIG. 4 is a diagrammatic view showing light refracted by the optical film of FIG. 3.

FIGS. 3 and 4 illustrate that each film portion 1200 comprises a plurality of strip-shaped micro-structures 121. Each micro-structure 121 has a triangular cross-section, and comprises a bottom surface 1211, a first side surface 1212, and a second side surface 1213. The bottom surfaces 1211 of the micro-structures 121 are connected to each other and cover the boundary 102 and the frame 20 mounted to the boundary 102. The first side surfaces 1212 and the second side surfaces 1213 of the micro-structures 121 are obliquely connected to each other. The second side surface 1213 of one micro-structure 121 is positioned at an outermost side of each film portion 1200. A first angle $\theta_1$ which is between the first side 1212 and bottom surface 1211 of each micro-structure 121 is less than a second angle $\theta_2$ which is between the first side surface 1212 and the second side surface 1213. A sum of the first and second angles $\theta_1$ and $\theta_2$ is less than 90°.

With the above configuration, the light from the display panel 10 is refracted by the first side surface 1212 and re-directed towards a connecting surface between two adjacent display screens 110. Thus, the light may entirely or partially cover the frame 20, thereby the frame 20 appears visually narrower.

It is to be understood that, even though information and advantages of the present exemplary embodiments have been set forth in the foregoing description, together with details of the structures and functions of the present exemplary embodiments, the disclosure is illustrative only; changes may be made in detail, especially in matters of shape, size, and arrangement of parts within the principles of the present exemplary embodiments, to the full extent indicated by the plain meaning of the terms in which the appended claims are expressed.

What is claimed is:

1. An optical film comprising:
   four film portions connected to each other to form a hollow rectangle, each film portion comprising a plurality of strip-shaped micro-structures, each micro-structure having a triangular cross-section, and comprising a bottom surface, a first side surface, and a second side surface, the bottom surfaces of the micro-structures connected to each other, the first side surfaces and the second side surfaces of the micro-structures obliquely connected to each other, the second side surface of one micro-structure positioned at an outermost side of each film portion;
   wherein a first angle $\theta_1$ which is between the first side and bottom surface of each micro-structure is less than a second angle $\theta_2$ which is between the first side surface and the second side surface, and a sum of the first angle $\theta_1$ and the second angle $\theta_2$ is less than 90°.

2. The optical film of claim 1, wherein the optical film has a thickness of about 0.025 mm to about 0.3 mm.

3. A display device with narrow frame comprising:
   a plurality of display screens each comprising a display panel and a frame, the display panel comprising a center area and four boundaries surrounding the center area, the frame mounted to the boundaries; and
   a plurality of optical films each formed on one display screen and comprising four film portions connected to each other to form a hollow rectangle, each film portion covering one boundary and the frame mounted to the boundary, and comprising a plurality of strip-shaped micro-structures, each micro-structure having a triangular cross-section, and comprising a bottom surface, a first side surface, and a second side surface, the bottom surfaces of the micro-structures connected to each other, the first side surfaces and the second side surfaces of the micro-structures obliquely connected to each other, the second side surface of one micro-structure positioned at an outermost side of each film portion;
   wherein a first angle $\theta_1$ which is between the first side and bottom surface of each micro-structure is less than a second angle $\theta_2$ which is between the first side surface and the second side surface, and a sum of the first angle $\theta_1$ and the second angle $\theta_2$ is less than 90°, thus causing light from the display panel to be refracted by the first side surface and to be re-directed towards a connecting surface between two adjacent display screens.

4. The display device with narrow frame of claim 3, wherein two film portions opposite to each other are mirror-image symmetrical.

5. The display device with narrow frame of claim 3, wherein the optical films have a thickness of about 0.025 mm to about 0.3 mm.

6. The display device with narrow frame of claim 5, wherein each display screen further comprises a backlight module; the backlight module comprises at least one backlight source, a circuit board, and a diffusion plate; an underside of the display panel, the frame, and the circuit board cooperatively define a receiving space for receiving the backlight source and the diffusion plate; the backlight source is fixed on and electrically connected to the circuit board; the diffusion plate is positioned closely to and attached to the display panel, and is positioned above the backlight source to direct light emitted from the backlight source towards the display panel.

7. The display device with narrow frame of claim 3, wherein the display screens are arranged in a matrix.

8. The display device with narrow frame of claim 3, wherein the display screens are liquid crystal display devices.

9. The display device with narrow frame of claim 3, wherein the display screens are plasma display devices.

10. The display device with narrow frame of claim 3, wherein the frame is made of opaque resin material.

11. The display device with narrow frame of claim 3, wherein the backlight source is an LED.

12. The display device with narrow frame of claim 3, wherein the backlight source is a diode laser.

* * * * *